United States Patent [19]

Hara et al.

[11] 3,896,265

[45] July 22, 1975

[54] FRAME SYNCHRONIZATION SYSTEM

[75] Inventors: Takao Hara; Yukio Murayama, both of Kawasaki, Japan

[73] Assignee: Fujitsu Limited, Kawasaki, Japan

[22] Filed: Oct. 26, 1973

[21] Appl. No.: 410,169

[30] Foreign Application Priority Data

Nov. 6, 1972 Japan .............................. 47-110961

[52] U.S. Cl. ............ 178/69.5 R; 325/320; 325/346; 325/349

[51] Int. Cl. ........................... H04l 7/04; H04l 27/14

[58] Field of Search ........... 178/69.5; 325/320, 346, 325/419, 420, 349, 476; 235/181; 329/50; 331/18; 328/133, 140

[56] References Cited

UNITED STATES PATENTS

| | | | |
|---|---|---|---|
| 3,440,540 | 4/1969 | Hane et al. | 325/346 |
| 3,447,085 | 5/1969 | DeHaas et al. | 178/69.5 R |
| 3,532,985 | 10/1970 | Glomb et al. | 178/69.5 R |
| 3,568,066 | 3/1971 | Fujimura | 325/349 |
| 3,646,269 | 2/1972 | Fudemoto et al. | 178/69.5 R |
| 3,769,587 | 10/1973 | Matsuo et al. | 178/69.5 R |

*Primary Examiner*—Malcolm A. Morrison
*Assistant Examiner*—Errol A. Krass
*Attorney, Agent, or Firm*—Daniel Jay Tick

[57] ABSTRACT

A frame synchronization system has false random signals produced by output clock signals of a voltage controlled oscillator and clock signals produced by shifting the output clock signals by $\pi/2$ and input signals correlated by correlators. The voltage corresponding to the phase difference is applied to an input of the voltage controlled oscillator. Correlators correlate the output clock signals of the voltage controlled oscillator. A level detection circuit detects a specific level of positive polarity of the output of the correlators. The system pulls a frame into synchronization at a true stable point by feeding to an input of the voltage controlled oscillator the voltage corresponding to the phase difference obtained from the correlation between the clock signals shifted by $\pi/2$ and the input signals when a specific level is detected in the level detection circuit.

7 Claims, 10 Drawing Figures

PN SIGNAL GENERATOR

FRAME SYNCHRONIZATION SYSTEM

BACKGROUND OF THE INVENTION

The present invention relates to a frame synchronization system. More particularly, the invention relates to a frame synchronization system for pulling a frame into synchronization.

In PCM-TDMA, or Time Divisional Multiple Access Pulse Code Modulation systems utilized in satellite communications, and so on, regular communication is started after the frame is pulled into synchronization at the receiving station. Because of this, the transmitting station sends noise-resistant false random signals, hereinafter identified as PN signals, in advance of communication to enable the receiving station to pull the frame into synchronization.

It has been proposed to use a frame synchronization system of a type hereinafter described. This system has the disadvantage that there is no normal pull in, because there are many false stable points, besides a true stable pull in point, as hereinafter described. Another disadvantage of the proposed system is that it requires a maximum pull in time of two frames.

The principal object of the invention is to provide a frame synchronization system which overcomes the disadvantages of known systems.

An object of the invention is to provide a frame synchronization system of simple structure, which functions efficiently, effectively and reliably to pull a frame into synchronization at a true stable point and eliminates the influence of a plurality of false stable points.

Another object of the invention is to provide a frame synchronization system which provides rapid and prompt pull into synchronization of a frame.

Still another object of the invention is to provide a frame synchronization system which facilitates rapid and prompt pull in by detecting an inverse stable point to complete a frame synchronization loop.

Yet another object of the invention is to provide a frame synchronization system including a phase detector in a simple structure.

BRIEF SUMMARY OF THE INVENTION

In accordance with the invention, a frame synchronization system for input signals comprising a combination of false random signals and clock signals, a first phase detector having an input supplied with the input signals, the first phase detector comprising a first correlator and a second correlator and having other inputs and an output, a voltage controlled oscillator having an input selectively coupled to the output of the first phase detector, the voltage controlled oscillator having an output, a first feedback circuit comprising a first feedback loop and a 90° phase shifter circuit connected therein for shifting output signals of the oscillator 90° in phase, the first feedback loop being connected between the output of the voltage controlled oscillator and another input of the first phase detector and a second feedback circuit comprising a second feedback loop and a false random signal generator connected therein for generating false random signals, the second feedback loop being connected between the output of the voltage controlled oscillator and still another input of the first phase detector, comprises a second phase detector including the first correlator and a third correlator and having an input coupled to the output of the voltage controlled oscillator for correlating the input signals with the output of the voltage controlled oscillator, the second phase detector having an output. A first level detection circuit has an input coupled to the output of the second phase detector for detecting a specific level of positive polarity of the output of the second phase detector. The first level detection circuit has an output. A switch circuit has an armature connected to the input of the voltage controlled oscillator, a first contact coupled to the output of the first phase detector and a second contact connected to a source of constant voltage. The switch circuit is coupled to the output of the first level detection circuit whereby the armature of the switch circuit selectively contacts the first and second contacts in accordance with specific levels of positive polarity detected by the level detection circuit.

The first phase detector comprises the first correlator. The first correlator has an input connected to the false random signal generator via the second feedback loop for correlating the input signals and the output of the false random signal generator. The first correlator has an output. The second correlator has an input connected to the output of the first correlator and another input connected to the 90° phase shifter circuit via the first feedback loop for correlating the output of the first correlator and the output of the 90° phase shifter circuit. The second correlator has an output coupled to the first contact of the switch circuit.

The second phase detector comprises the first correlator and the third correlator. The third correlator has an input connected to the output of the first correlator and another input coupled to the output of the voltage controlled osciallator for correlating the output of the first correlator and the output of the voltage controlled oscillator. The third correlator has an output coupled to the input of the first level detection circuit.

A second level detection circuit has an input coupled to the output of the third correlator of the second phase detector for detecting a specific level of negative polarity of the output of the second phase detector. The second level detection circuit has an output. Circuit means has an input connected to the output of the voltage controlled oscillator and another input coupled to the output of the voltage controlled oscillator when the specific level of negative polarity is detected by the second level detection circuit. The circuit means has an output connected to the input of the 90° phase shifter of the first feedback loop, the input of the false random signal generator of the second feedback loop and the other input of the third correlator of the second phase detector.

A low pass filter is connected between the output of the second correlator of the first phase detector and the first contact of the switch circuit. Another low pass filter is connected between the output of the third correlator of the second phase detector and the inputs of the first and second level detection circuits.

A flip flop is connected between the output of the first level detection circuit and the switch circuit. Another flip flop is connected between the output of the second level detection circuit and the other input of the circuit means.

The circuit means comprises a 180° phase shifter.

BRIEF DESCRIPTION OF THE DRAWINGS

In order that the invention may be readily carried into effect, it will now be described with reference to the accompanying drawings, wherein.

In the figures, the same components are identified by the same reference numerals.

DETAILED DESCRIPTION OF THE INVENTION

Figure 1:
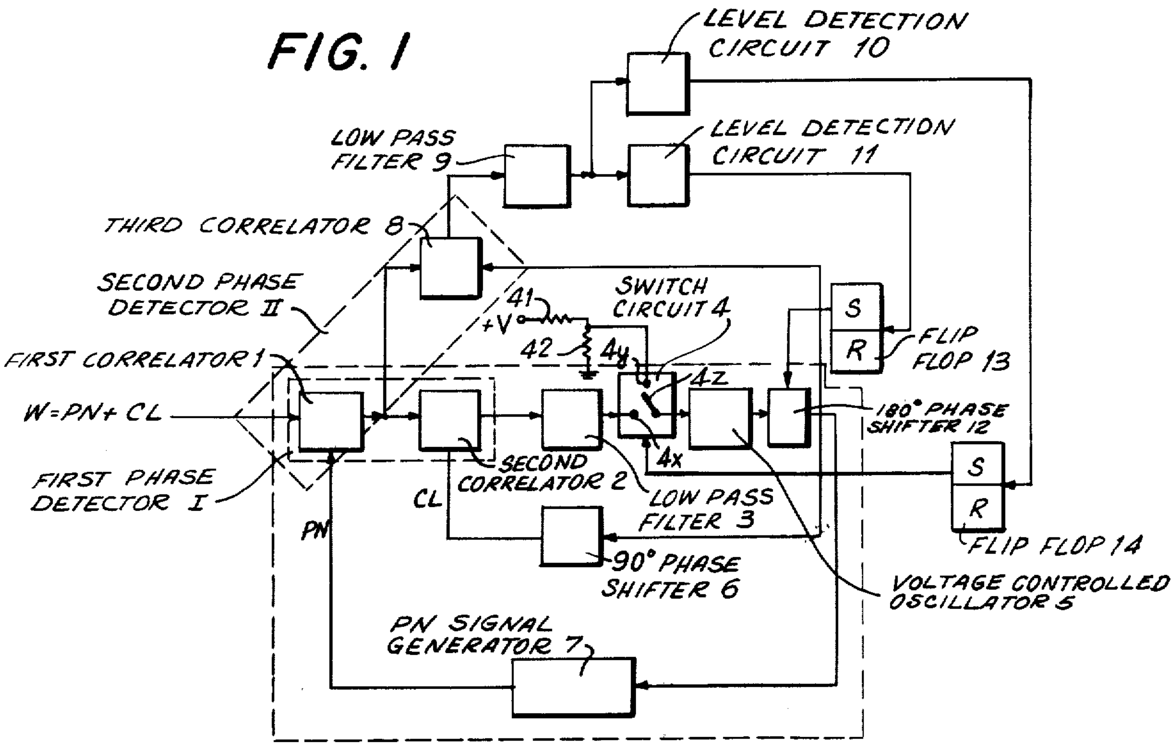
FIG. 1 is a block diagram of an embodiment of the frame synchronization system of the invention.
Figures 4A, 4B, 4C:
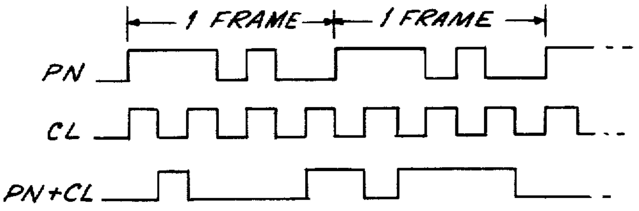
FIG. 4*a* is a graphical presentation of the false random or PN signals.
FIG. 4*b* is a graphical presentation of the clock signals CL.
FIG. 4*c* is a graphical presentation of the resultant signals PN + CL of the addition of the PN and CL signals.

FIG. 1 illustrates an embodiment of the frame synchronization system of the invention. The proposed frame synchronization system hereinbefore referred to is the circuit enclosed by broken lines in FIG. 1. The noise-resistant false random signals PN are one frame 7 bits in structure, as shown in FIG. 4*a*. The modulo 2 addition of the PN signals and the clock signals shown in FIG. 4*b* results in resultant signals PN + CL, as shown in FIG. 4*c*, for transmission. The resultant signals PN + CL are supplied to the frame synchronization system of the receiver station.

The circuit of FIG. 1 produces clock signals CL and false random signals PN in accordance with the output of a voltage controlled oscillator 5. The PN and CL signals are correlated with the input signals and supply an analog voltage corresponding to the phase difference to the voltage controlled oscillator 5. The voltage controlled oscillator 5 produces an output signal having a frequency corresponding to the input analog voltage. When the input voltage becomes zero, the frequency of oscillation is fixed to execute the pull in of the frame.

The operation of FIG. 1 is described under the assumption that the false random signals PN consist of one frame, for example, 7 bits structure, as shown in FIG. 4*a*.

The frame synchronization system of FIG. 1 comprises a plurality of correlators 1, 2 and 8 and a 180° phase shifter or phase inverter 12. The correlator 1 is the first correlator. The correlator 2 is the second correlator. The correlator 8 is the third correlator. Each of the correlators 1, 2 and 8 produces an output of "1" only when two input levels are mutually inconsistent. Each of the correlators may comprise a type of ring modulator comprising a pair of transformers T1 and T2 and diodes D1, D2, D3 and D4, as shown in FIG. 2.

Figure 2:
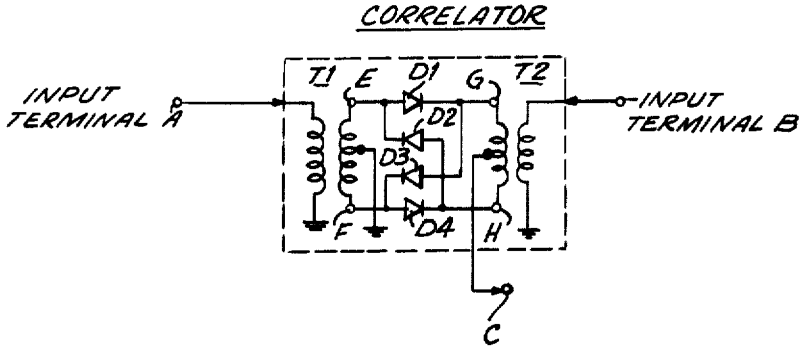
FIG. 2 is a circuit diagram of an embodiment of a correlator which may be utilized as each of the correlators of the frame synchronization system of the invention.

In the correlator of FIG. 2, a first input signal is supplied to the primary winding of the transformer T1 via an input terminal A and a second input signal is supplied to the primary winding of the transformer T2 via an input terminal B. One end terminal E of the secondary winding of the transformer T1 is coupled to one end terminal G of the secondary winding of the transformer T2 via the diode D1, with the anode of the diode connected to the terminal E. The other end terminal F of the secondary winding of the transformer T1 is coupled to the other end terminal H of the secondary winding of the transformer T2 via the diode D4, with the anode of the diode connected to the terminal F. The diode D2 is connected between the terminals E and H, with the anode of the diode connected to the terminal H. The diode D3 is connected between the terminals F and G, with the anode of the diode connected to the terminal G. The midpoint of the secondary winding of the transformer T1 is connected to a point at ground potential. The midpoint of the secondary winding of the transformer T2 is connected to the input of the low pass filter 3 or 9 of FIG. 1.

In the correlator of FIG. 2, when two inputs inconsistent in level are supplied via the input terminals A and B, an output "1" is produced at circuit point C.

The correlators 1 and 2 are combined as a first phase detector I and the correlators 1 and 8 are combined as a second phase detector II. A $\pi/2$ or 90° phase shifter 6 shifts the clock signals produced by the voltage controlled oscillator 5 by $\pi/2$ or 90° and may readily comprise a delay circuit, and so on. A PN signal generator 7 comprises a circuit for producing false random signals PN in accordance with the clock signals CL from the voltage controlled oscillator 5.

Figure 3:
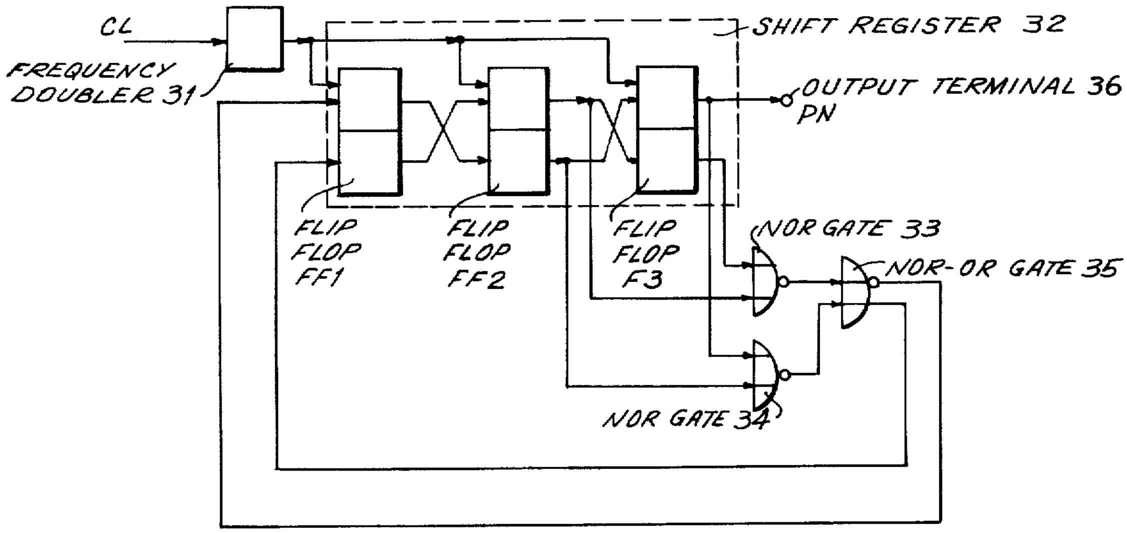
FIG. 3 is a block diagram of an embodiment of the PN or false random signal generator of the frame synchronization system of the invention.

FIG. 3 shows an embodiment of a PN signal generator. The PN signal generator of FIG. 3 comprises a frequency doubler 31 which doubles the frequency of the input of the clock signals CL from the voltage controlled oscillator 5. A shift register 32 comprising three flipflop circuits FF1, FF2 and FF3, is connected to the output of the frequency doubler 31 and shifts the clock signals from the frequency doubler circuit. A NOR gate 33 has one input connected to the reset output of the flip flop FF3 and another input connected to the set output of the flip flop FF2. A NOR gate 34 has one input connected to the set output of the flip flop FF3 and another input connected to the reset output of the flip flop FF2. The NOR gate 33 has an output connected to one input of a NOR-OR gate 35. The NOR gate 34 has an output connected to another input of the NOR-OR gate 35. The NOR-OR gate 35 has one output connected to the set input of the flip flop FF1 and another output connected to the reset input of said flip flop. The PN signals are provided at an output terminal 36. Other PN signals may be produced by the PN signal generator 7 by changing the number of flip flop circuits of the shift register and the input of the gate circuits connected in the feedback loop thereof.

In the known circuit part of the frame synchronization system of FIG. 1, enclosed by broken lines, the combined PN + CL signals are supplied to an input of the first correlator 1. The output of the first correlator 1 is connected to an input of the second correlator 2.

The first and second correlators 1 and 2 function as a first phase detector I. The output of the second correlator 2 is coupled to a switch contact 4$x$ of a switch circuit 4 via a low pass filter 3. The switch circuit 4 has a switch contact 4$y$ coupled to a voltage source +V via a resistor 41 and to a point at ground potential via a resistor 42. The switch circuit 4 has an armature 4$z$ connected to an input of the voltage controlled oscillator 5. The 90° phase shifter 6 is connected in a first loop between the output of the voltage controlled oscillator 5 and another input of the second correlator 2. The PN signal generator 7 is connected in a second loop between the output of the voltage controlled oscillator 5 and another input of the first correlator 1.

The remainder of the frame synchronization system of FIG. 1 comprises the third correlator 8 having an input connected to the output of the first correlator 1 and another input coupled to the output of the voltage controlled oscillator 5 via the phase inverter 12. The first and third correlators 1 and 8 function as a second phase detector II. The output of the third correlator 8 is coupled in common to the input of a level detection circuit 10 and to the input of a level detection circuit 11 via a low pass filter 9.

The output of the level detection circuit 11 is connected to a flip flop 13. The set output of the flip flop 13 is connected to another input of the phase inverter 12. The output of the level detection circuit 10 is connected to a flip flop 14. The set output of the flip flop 14 is connected to the switch circuit 4.

The known circuit of FIG. 1 enclosed by broken lines operates as follows. The input signals W are the combined false random signals PN and clock signals CL and are utilized for synchronization. The input signals $W$ are thus defined as $$W = PN + CL$$

The input signals $W$ are thus those shown in FIG. 4$c$, which are a combination of the $PN$ signals having 7 bits of 1 1 1 0 1 0 0 in one frame as shown in FIG. 4$a$, with the clock signals $CL$, as shown in FIG. 4$b$ and are provided by an exclusive OR function.

The input signals $W$ are correlated by the correlators 1 and 2, respectively, with the PN signals produced by the PN signal generator 7 and with the clock signals CL shifted by $\pi/2$ from the voltage controlled oscillator 5 by the $\pi/2$ phase shifter 6, respectively.

Figure 5:
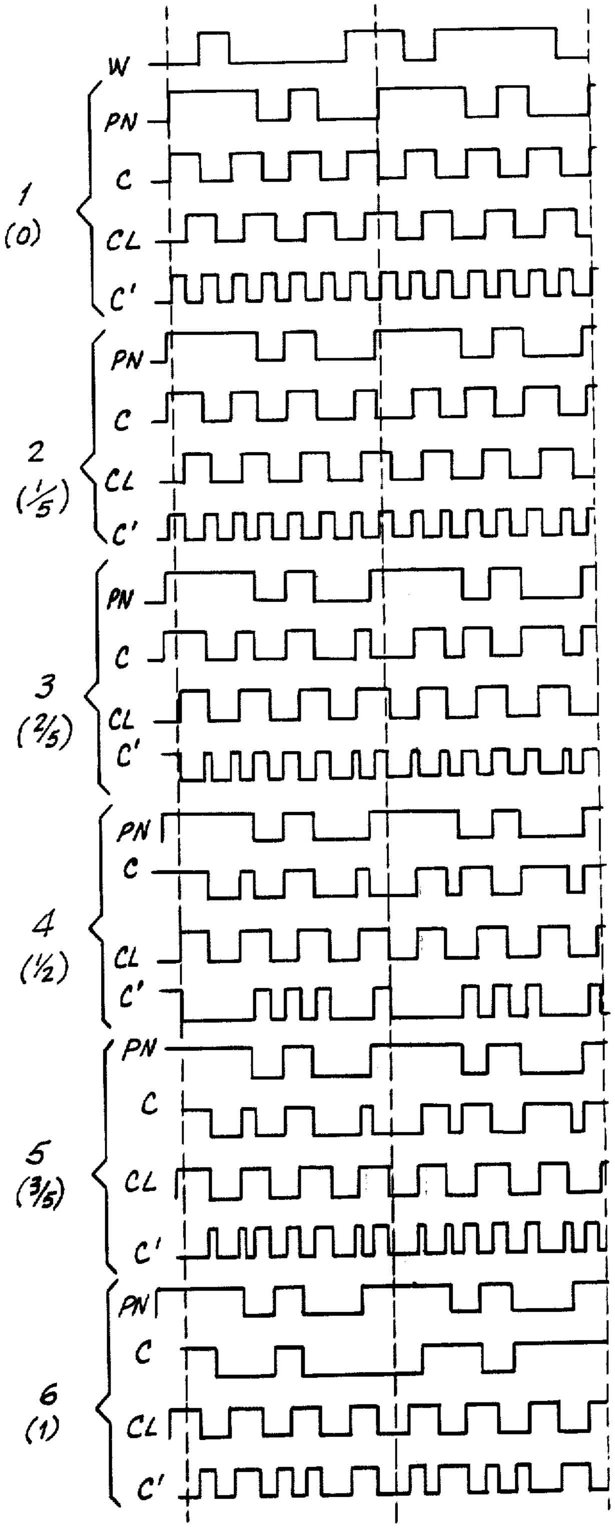
FIG. 5 is a graphical presentation of the pulses in the correlators in different phase conditions for explaining the operation of each correlator of FIG. 1.

FIG. 5 shows the aforedescribed situation by illustrating the phase shifting conditions of 1/5, 2/5, ½, 3/5 and 1 bit, starting from the synchronized condition and indicated by numbers 1 to 6. In the various conditions, PN is the output of the PN signal generator 7, CL is the output of the $\pi/2$ phase shifter 6, W is the input signals, C is the output of the correlator 1 and C′ is the output of the correlator 2 at the circuit point C shown in FIG. 2. The output C′, shown in FIG. 5, is integrated by the low pass filter 3 shown in FIG. 1, and becomes an analog output.

Figure 6:
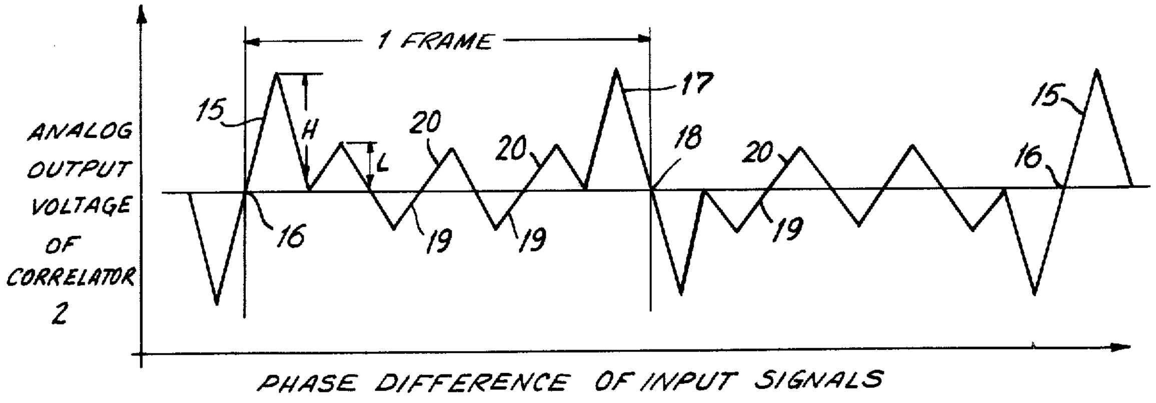
FIG. 6 is a graphical presentation of the output voltage of the second correlator 2 of FIG. 1 relative to the phase difference of the input signals.

The relation between the phase difference of the input signals W and the analog output of the low pass filter 3 thus obtained is shown in FIG. 6. In FIG. 6, the abscissa represents the phase difference from the synchronous condition and the ordinate represents the analog output voltage of the low pass filter 3.

The contact 4$y$ of the switch circuit 4 is connected to the voltage controlled oscillator 5 via the armature 4$z$ for effecting pull in. Furthermore, the voltage controlled oscillator 5 produces output signals having a frequency corresponding to the input voltage. Therefore, if signals having a higher frequency than the repetitive frequency of the input signals are fed from the output of the voltage controlled oscillator 5 to the contact 4$y$ of the switch circuit 4 at a specific voltage provided by the resistors 41 and 42, the phase difference between the input signals and the output signals of the voltage controlled oscillator 5 varies periodically. This condition is called frame synchronization sweep, and the pull in condition exists when the phase difference is zero.

FIG. 6 then shows a characteristic having successive low waves L having a maximum amplitude between high waves H of maximum amplitude which intersect the zero line to have zero amplitude in a period of one frame. The zero intersection of the positive slope or inclination 15 is the stable point 16 of synchronization, and appears every two frames, as shown in FIG. 6. At this point, there is a characteristic of stability at the zero intersection 16 even if there is a slight difference between the input phase and the feedback phase. The center of the stable points 16, or the point spaced from the stable point by one frame, has a negative slope or inclination 17 which is as high as the slope or inclination 15, and the zero intersection is an inverse stable point 18. At this point, a slight difference or displacement of synchronization destroys stability, moving it in another direction.

If it is assumed that a positive output of the low pass filter 3 decreases the output frequency of the voltage controlled oscillator 5 correspondingly to the output power of the correlator, a negative output increases the output frequency. Therefore, when the point 16 of FIG. 6 is a stable point, the point 18 of the inversely inclined characteristic is controlled in the direction in which the output of the voltage controlled oscillator 5 increases the phase difference, making itself an unstable point or inverse stable point. Furthermore, between the stable point 16 and the inverse stable point 18, there are false stable points 19, which are the zero intersections of positive slopes of inclinations similar to the positive slope or inclination 15.

Therefore, when there is a frame phase sweep in such a frame synchronization loop, there is a possibility of synchronization occurring at any of the false stable points instead of the desirable stable point 16, and signal synchronization cannot be established. Furthermore, the phase sweep must be performed in a two frame maximum period in seeking a stable point, thereby requiring considerable time for synchronization.

The frame synchronization system of the invention overcomes the aforedescribed disadvantages. In the frame synchronization system of the invention, as shown in FIG. 1, the correlator 8, which has the same circuit structure as the correlator 2 and the output of which is integrated by the low pass filter 9, provides a correlation between the output of the correlator 1 and the clock signals CL of the output of the voltage controlled oscillator 5 which are not passed through the $\pi/2$ phase shifter 6. The relation of the analog output voltage of the low pass filter 9 and the phase difference of the input signals is shown in FIG. 8.

Figure 8:
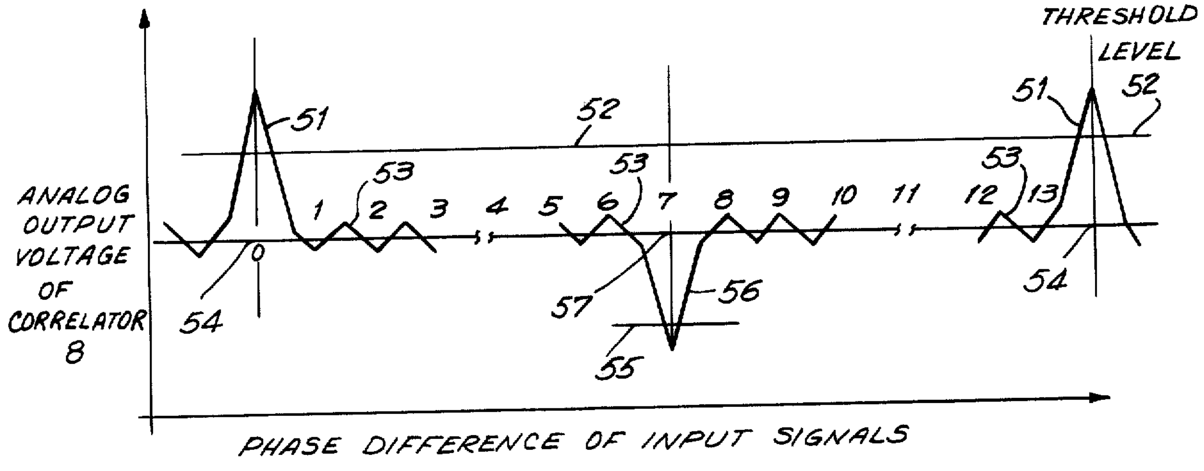
FIG. 8 is a graphical presentation of the output of the third correlator 8 of FIG. 1 relative to the phase difference of the input signals.

In FIG. 8, as in FIG. 6, the abscissa represents the phase difference of the input signals and the ordinate represents the analog output voltage. PN signals of 7 bits of FIG. 4$a$ are utilized. However, levels of "1" appear at stable points and levels of "−1" appear at unstable points. False stable points have levels, and not zero. In comparison with FIG. 6, the logic of synchronization stable points is inverse, because the correlator 8 correlates the clock signals fed to one of its inputs from the output of the voltage controlled oscillator 5, without phase shifting, with the output of the first correlator 1.

The output of the third correlator 8 is fed to the inputs of the two level detection circuits 10 and 11 via the low pass filter 9. The level detection circuits 10 and 11 may readily comprise Schmitt trigger circuits, and so on, although they have different threshold levels. In FIG. 8, a waveform 51 of positive polarity appears every two frames. An appropriate threshold level 52 may be set in the level detection circuit 10 to effect phase sweep for two frames. Then, only the waveform 51 can be detected, regardless of false stable points 53, and synchronization occurs in the neighborhood of stable point 54 and at the stable points 54 by pull in, as hereinbefore mentioned.

Figure 7:
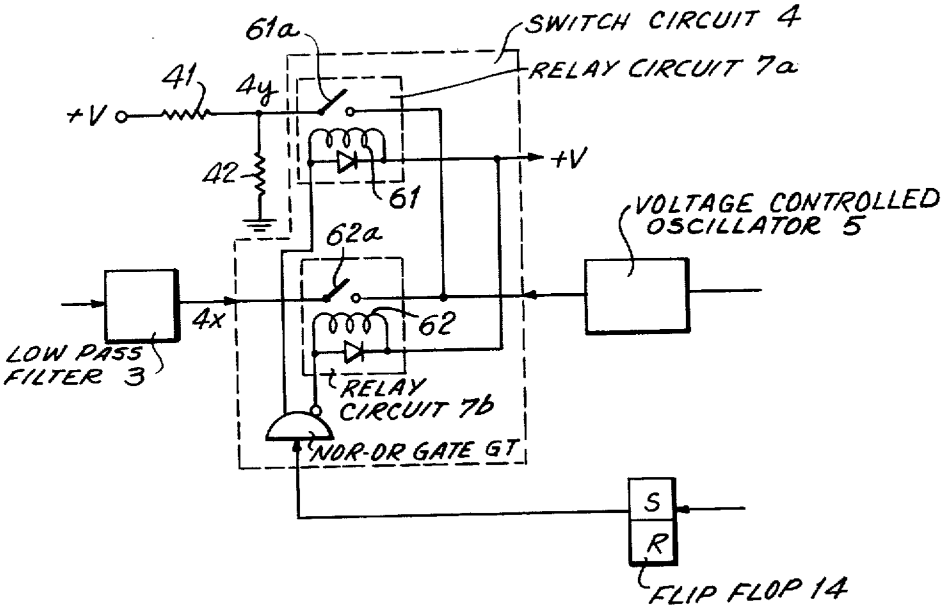
FIG. 7 is a circuit diagram of an embodiment of the switch circuit 4 of FIG. 1.

When the level detection circuit 10 detects an increase above the threshold level 52, a pulse output is produced to set the flip flop 14 of FIG. 1. The setting of the flip flop 14 switches the switch circuit 4 to its contact 4*x* thereby connecting the low pass filter 3 to the voltage controlled oscillator 5 and forming a synchronization loop. As shown in FIG. 7, the switch circuit 4 comprises, for example, relay circuits 7*a* and 7*b* and a gate circuit GT. The gate circuit GT is a NOR-OR gate. The input potential at the gate varies in accordance with whether the flip flop 14 is set or not. If the flip flop 14 is set, the relay circuit 7*a* is energized, its relay winding 61 is energized, closing its contact 61*a*, and no current flows in the relay circuit 7*b*, since its relay winding 62 is deenergized and its contact 62*a* is open.

The detection of the threshold level 52 only by the level detection circuit 10 necessitates that the phase sweep be made for two frames, thereby taking much time for synchronization. To cope with this, the level detection circuit 11 is provided in the frame synchronization system of the invention. The level detection circuit 11 detects a threshold level 55 in FIG. 8. When the threshold level 55 is detected, pulses are delivered at the output of the level detection circuit 11 to set the flip flop 13 of FIG. 1. The 180° phase shifter 12, is connected between the voltage controlled oscillator 5 and the third correlator 8. The output of the 180° phase shifter is connected to the third correlator 8, the 90° phase shifter 6 and the false random signal generator 7. The clock signals CL from the voltage controlled oscillator 5 are shifted 180° in phase by the 180° phase shifter 12, when the flip flop 13 supplies a signal to said phase shifter. When the flip flop 13 does not supply a signal to the phase shifter 12, the output of the voltage controlled oscillator 5 is supplied to the third correlator 8, the 90° phase shifter 6 and the false random signal generator 7.

It is understandable from the foregoing explanation that the 180° phase shift or inversion of the input clock signals CL to the correlator 8 also inverts the analog output voltage. The inversion of the analog output voltage in FIG. 8 makes the waveform 56 the same as the waveform 51 and makes the inverse stable point 57 appear as a stable point. The inverted waveform 56 is therefore successively detected by the level detection circuit 10, and the level detecting signals set the flip flop 14, with the switch 4 connected at its contact 4*x* to close the synchronization loop.

Thus, a waveform of negative polarity at an inverse stable point can be used as a waveform of positive polarity for synchronization, the same as a stable point. A sweep of one frame maximum is therefore sufficient for synchronization in contrast to the necessary sweep of two frames maximum required in known systems. This reduces the time to half in the frame synchronization system of the invention.

As hereinbefore described, the frame synchronization system of the invention provides accurate and rapid frame synchronization. This is due to the fact that the frame synchronization system of the invention completely removes the influence of false stable points and considerably shortens the time of synchronization by inverting an inverse stable point to a stable point.

The components of the frame synchronization system of the invention not illustrated herein are known and may comprise any suitable known circuitry.

While the invention has been described by means of a specific example and in a specific embodiment, we do not wish to be limited thereto, for obvious modifications will occur to those skilled in the art without departing from the spirit and scope of the invention.

We claim:

1. A frame synchronization system for input signals comprising a combination of false random signals and clock signals, a first phase detector having an input supplied with the input signals, the first phase detector comprising a first correlator and a second correlator and having other inputs and an output, a voltage controlled oscillator having an input selectively coupled to the output of the first phase detector, the voltage controlled oscillator having an input, a first feedback circuit comprising a first feedback loop and a 90° phase shifter circuit connected therein for shifting output signals of the oscillator 90° in phase, the first feedback loop being connected between the output of the voltage controlled oscillator and another input of the first phase detector and a second feedback circuit comprising a second feedback loop and a false random signal generator connected therein for generating false random signals, the second feedback loop being connected between the output of the voltage controlled oscillator and still another input of the first phase detector, the frame synchronization system comprising a second phase detector including the first correlator and a third correlator and having an input coupled to the output of the voltage controlled oscillator for correlating the input signals with the output of the voltage controlled oscillator, the second phase detector having an output;

a first level detection circuit having an input coupled to the output of the second phase detector for detecting a specific level of positive polarity of the output of the second phase detector, the first level detection circuit having an output;

a source of constant voltage; and a switch circuit having an armature connected to the input of the voltage controlled oscillator, a first contact coupled to the output of the first phase detector and a second contact connected to the source of constant voltage, the switch circuit being coupled to the output of the first level detection circuit whereby the armature of the switch circuit selectively contacts the first and second contacts in accordance with specific levels of positive polarity detected by the level detection circuit.

2. A frame synchronization system as claimed in claim 1, wherein the first phase detector comprises the first correlator, said first correlator having an input connected to the false random signal generator via the second feedback loop for correlating the input signals and the output of the false random signal generator, the first correlator having an output, and the second correlator having an input connected to the output of the first correlator and another input connected to the 90° phase shifter circuit via the first feedback loop for correlating the output of the first correlator and the output of the 90° phase shifter circuit, the second correlator having an output coupled to the first contact of the switch circuit.

3. A frame synchronization system as claimed in claim 2, wherein the second phase detector comprises the first correlator and the third correlator, said third correlator having an input connected to the output of the first correlator and another input coupled to the output of the voltage controlled oscillator for correlating the output of the first correlator and the output of the voltage controlled oscillator, the third correlator having an output coupled to the input of the first level detection circuit.

4. A frame synchronization system as claimed in claim 3, further comprising a second level detection circuit having an input coupled to the output of the third correlator of the second phase detector for detecting a specific level of negative polarity of the output of the second phase detector, the second level detection circuit having an output, and circuit means having an input connected to the output of the voltage controlled oscillator and another input coupled to the output of the second level detection circuit when the specific level of negative polarity is detected by the second level detection circuit, the circuit means having an output connected to the input of the 90° phase shifter of the first feedback loop, the input of the false random signal generator of the second feedback loop and the other input of the third correlator of the second phase detector.

5. A frame synchronization system as claimed in claim 4, further comprising a low pass filter connected between the output of the second correlator of the first phase detector and the first contact of the switch circuit and another low pass filter connected between the output of the third correlator of the second phase detector and the inputs of the first and second level detection circuits.

6. A frame synchronization system as claimed in claim 4, further comprising a flip flop connected between the output of the first level detection circuit and the switch circuit and another flip flop connected between the output of the second level detection circuit and said another input of the circuit means.

7. A frame synchronization system as claimed in claim 4, wherein the circuit means comprises a 180° phase shifter.

* * * * *